(12) United States Patent
Sun et al.

(10) Patent No.: US 6,835,462 B2
(45) Date of Patent: Dec. 28, 2004

(54) CONFORMABLE AND DIE-CUTTABLE BIAXIALLY ORIENTED FILMS AND LABELSTOCKS

(75) Inventors: Edward I. Sun, Arcadia, CA (US); Ramin Heydarpour, Beverly Hills, CA (US); Karl Josephy, Los Angeles, CA (US); Johannes Schut, Alphen aan den Rijn (NL); Eng-Pi Chang, Arcadia, CA (US); Yao-Feng Wang, Diamond Bar, CA (US)

(73) Assignee: Avery Dennison Corporation, Pasadena, CA (US)

(*) Notice: Subject to any disclaimer, the term of this patent is extended or adjusted under 35 U.S.C. 154(b) by 155 days.

(21) Appl. No.: 10/236,769

(22) Filed: Sep. 6, 2002

(65) Prior Publication Data

US 2003/0113535 A1 Jun. 19, 2003

Related U.S. Application Data

(62) Division of application No. 09/531,978, filed on Mar. 20, 2000.

(51) Int. Cl.$^7$ .............................................. B32B 27/08
(52) U.S. Cl. ........................ 428/515; 428/516; 428/500
(58) Field of Search ................................ 428/516, 515, 428/500

(56) References Cited

U.S. PATENT DOCUMENTS

| | | | |
|---|---|---|---|
| 2,718,666 A | 9/1955 | Knox | 18/57 |
| 2,920,352 A | 1/1960 | Miller et al. | 18/57 |
| 3,036,945 A | 5/1962 | Souza | 154/53.5 |
| 3,100,722 A | 8/1963 | Hermann et al. | 117/138.8 |
| 3,154,461 A | 10/1964 | Johnson | 161/116 |
| 3,187,982 A | 6/1965 | Underwood et al. | 229/51 |
| 3,234,062 A | 2/1966 | Morris | 156/104 |
| 3,309,452 A | 3/1967 | Yumoto et al. | 264/284 |
| 3,354,506 A | 11/1967 | Raley | 18/14 |
| 3,370,951 A | 2/1968 | Hausenauer et al. | 96/87 |
| 3,381,717 A | 5/1968 | Tyrrell | 138/137 |
| 3,382,206 A | 5/1968 | Karickhoff | 260/40 |
| 3,468,744 A | 9/1969 | Reinhart | 161/6 |
| 3,515,626 A | 6/1970 | Duffield | 161/162 |
| 3,540,959 A | 11/1970 | Connor | 156/203 |
| 3,576,707 A | 4/1971 | Schrenk et al. | 161/164 |
| 3,690,909 A | 9/1972 | Finley | 117/6 |
| 3,741,841 A | 6/1973 | Toyoda et al. | 156/229 |
| 3,765,999 A | 10/1973 | Toyoda | 161/170 |
| 3,767,523 A | 10/1973 | Schwarz | 161/254 |
| 3,773,608 A | 11/1973 | Yoshimura et al. | 161/168 |
| 3,817,177 A | 6/1974 | Van Arnam et al. | 101/426 |
| 3,841,943 A | 10/1974 | Takashi et al. | 156/494 |
| 3,842,152 A | 10/1974 | Witfield, Jr. et al. | 264/210 R |
| 3,854,229 A | 12/1974 | Morgan | 40/2 |
| 3,854,581 A | 12/1974 | Jones, Jr. | 206/460 |
| 3,871,947 A | 3/1975 | Brekken | 161/116 |
| 3,894,904 A | 7/1975 | Cook | 156/229 |
| 3,908,065 A | 9/1975 | Stigen | 428/329 |
| 3,924,051 A | 12/1975 | Wiggins et al. | 428/520 |
| 3,936,567 A | 2/1976 | Vesely | 428/325 |
| 3,963,851 A | 6/1976 | Toyoda | 428/305 |
| 3,968,196 A | 7/1976 | Wiley | 264/171 |
| 3,971,866 A | 7/1976 | Johnson | 428/40 |
| 3,979,000 A | 9/1976 | Karabedian | 215/12 R |
| 4,008,115 A | 2/1977 | Fairbanks et al. | 156/267 |
| 4,011,358 A | 3/1977 | Roelofs | 428/287 |
| 4,020,215 A | 4/1977 | Michaylov | 428/420 |
| 4,024,312 A | 5/1977 | Korpman | 428/343 |
| 4,051,293 A | 9/1977 | Wiley | 428/213 |
| 4,057,667 A | 11/1977 | Wiggens et al. | 428/35 |
| 4,069,934 A | 1/1978 | Karabedian | 215/12 R |
| 4,082,880 A | 4/1978 | Zboril | 428/220 |

(List continued on next page.)

FOREIGN PATENT DOCUMENTS

| | | |
|---|---|---|
| CA | 888148 | 12/1971 |
| CA | 1138817 | 1/1983 |
| CH | 633481 | 12/1982 |
| DE | 2112030 | 9/1971 |
| DE | 2402120 | 8/1974 |
| DE | 3422302 | 12/1985 |
| DE | 3501726 | 7/1986 |
| EP | 060421 | 9/1982 |
| EP | 083495 | 7/1983 |
| EP | 122495 | 10/1984 |
| EP | 189066 | 7/1986 |
| EP | 377 289 | 12/1989 |
| EP | 358667 B2 | 3/1990 |
| EP | 617 660 | 12/1992 |
| EP | 584 451 | 4/1993 |
| EP | 554406 | 8/1993 |

(List continued on next page.)

OTHER PUBLICATIONS

Affidavit of Francis Delannay—dated Aug. 13, 1999.

(List continued on next page.)

Primary Examiner—Daniel Zirker
(74) Attorney, Agent, or Firm—Renner, Otto, Boisselle & Sklar, LLP

(57) ABSTRACT

This invention relates to a die-cuttable, biaxially stretch-oriented monolayer film comprising a polyethylene having a density of about 0.940 g/cm$^3$ or less, a propylene polymer or copolymer, or mixtures thereof, wherein the tensile modulus of the film in the machine direction is greater than the tensile modulus in the cross direction, the tensile modulus of the film in the cross direction is about 150,000 psi or less, and the film is free of copolymers of ethylene with an ethylenically unsaturated carboxylic acid or ester. Die-cuttable, stretch-oriented multilayer films also are described comprising the above films as a base layer, and a thermoplastic polymer skin layer bonded to the upper surface of the base layer. The biaxially oriented monolayer and multilayer films are useful in particular in preparing adhesive containing labelstock for use in adhesive labels.

38 Claims, No Drawings

U.S. PATENT DOCUMENTS

| | | |
|---|---|---|
| 4,091,150 A | 5/1978 | Roelofs .................. 428/57 |
| 4,100,237 A | 7/1978 | Wiley .................. 264/40.6 |
| 4,118,438 A | 10/1978 | Matsui et al. ............ 260/857 L |
| 4,147,827 A | 4/1979 | Breidt, Jr. et al. .......... 428/218 |
| 4,166,464 A | 9/1979 | Korpman .................. 604/366 |
| 4,172,163 A | 10/1979 | Magnotta .................. 428/40 |
| 4,188,443 A | 2/1980 | Mueller et al. ............ 428/216 |
| 4,189,519 A | 2/1980 | Ticknor .................. 428/476 |
| 4,191,719 A | 3/1980 | Jack et al. .................. 264/41 |
| 4,233,367 A | 11/1980 | Ticknor et al. .......... 428/476.3 |
| 4,235,341 A | 11/1980 | Martin et al. ............ 206/601 |
| 4,242,402 A | 12/1980 | Korpman .................. 428/212 |
| 4,246,058 A | 1/1981 | Reed .................. 156/183 |
| 4,254,169 A | 3/1981 | Schroeder .................. 428/35 |
| 4,289,821 A | 9/1981 | Gray, III et al. ............ 428/172 |
| 4,297,415 A | 10/1981 | Ward et al. .................. 428/516 |
| 4,302,504 A | 11/1981 | Lansbury et al. ............ 428/332 |
| 4,303,708 A | 12/1981 | Gebhardt et al. ............ 428/35 |
| 4,316,759 A | 2/1982 | Becker et al. ............ 156/387 |
| 4,318,950 A | 3/1982 | Takashi et al. ............ 428/143 |
| 4,322,450 A | 3/1982 | Gray, III et al. ............ 427/44 |
| 4,331,727 A | 5/1982 | Maas .................. 428/213 |
| 4,343,851 A | 8/1982 | Sheptak .................. 428/212 |
| 4,346,855 A | 8/1982 | Biggar, III .................. 242/67.2 |
| 4,361,628 A | 11/1982 | Krueger et al. .......... 428/475.8 |
| 4,362,844 A | 12/1982 | Lemstra et al. ............ 525/57 |
| 4,377,050 A | 3/1983 | Renholts .................. 40/615 |
| 4,377,616 A | 3/1983 | Ashcraft et al. ............ 428/213 |
| 4,379,806 A | 4/1983 | Korpman .................. 428/354 |
| 4,380,567 A | 4/1983 | Shigemoto .................. 428/213 |
| 4,384,024 A | 5/1983 | Mitchell et al. ............ 428/349 |
| 4,386,135 A | 5/1983 | Campbell et al. ............ 428/447 |
| 4,389,450 A | 6/1983 | Schaefer et al. ............ 428/212 |
| 4,393,115 A | 7/1983 | Yochii et al. ............ 428/323 |
| 4,398,985 A | 8/1983 | Eagon .................. 156/233 |
| 4,399,179 A | 8/1983 | Minami et al. ............ 428/212 |
| 4,402,172 A | 9/1983 | Krueger .................. 53/425 |
| 4,405,401 A | 9/1983 | Stahl .................. 156/248 |
| 4,407,897 A | 10/1983 | Farrell et al. ............ 428/516 |
| 4,410,582 A | 10/1983 | Tsunashima et al. ........ 428/212 |
| 4,414,261 A | 11/1983 | Nanbu .................. 428/213 |
| 4,414,275 A | 11/1983 | Woods .................. 428/352 |
| 4,424,256 A | 1/1984 | Christensen et al. ........ 428/347 |
| 4,425,410 A | 1/1984 | Farrell et al. ............ 428/516 |
| 4,427,732 A | 1/1984 | Gray, III et al. ............ 428/172 |
| 4,429,015 A | 1/1984 | Sheptak .................. 428/201 |
| 4,438,175 A | 3/1984 | Ashcraft et al. .......... 428/315.5 |
| 4,439,478 A | 3/1984 | Ferguson et al. ............ 428/137 |
| 4,440,824 A | 4/1984 | Bonis .................. 428/216 |
| 4,447,485 A | 5/1984 | Aritake .................. 428/144 |
| 4,454,179 A | 6/1984 | Bennett et al. ............ 428/41 |
| 4,463,861 A | 8/1984 | Tsubone et al. .......... 215/12 R |
| 4,464,443 A | 8/1984 | Farrell et al. ............ 428/688 |
| 4,465,729 A | 8/1984 | Cancio et al. ............ 428/167 |
| 4,472,227 A | 9/1984 | Toyoda et al. .......... 156/244.11 |
| 4,475,971 A | 10/1984 | Canterino .................. 156/163 |
| 4,478,663 A | 10/1984 | O'Sullivan .................. 156/203 |
| 4,501,797 A | 2/1985 | Super et al. ............ 428/349 |
| 4,502,263 A | 3/1985 | Crass et al. .................. 53/396 |
| 4,513,028 A | 4/1985 | Aritake .................. 427/173 |
| 4,513,050 A | 4/1985 | Akao .................. 428/200 |
| 4,517,044 A | 5/1985 | Arnold .................. 156/277 |
| 4,522,887 A | 6/1985 | Koebisu et al. ............ 428/461 |
| 4,525,416 A | 6/1985 | Hammerschmidt et al. . 428/220 |
| 4,528,055 A | 7/1985 | Hattemer .................. 156/247 |
| 4,529,654 A | 7/1985 | Drum .................. 428/340 |
| 4,544,590 A | 10/1985 | Egan .................. 428/40 |
| 4,551,380 A | 11/1985 | Schoenberg .............. 428/218 |
| 4,565,738 A | 1/1986 | Purdy .................. 428/349 |
| 4,568,403 A | 2/1986 | Egan .................. 156/247 |
| 4,572,854 A | 2/1986 | Dallmann et al. ............ 428/35 |
| 4,581,262 A | 4/1986 | Karabedian .................. 428/35 |
| 4,582,736 A | 4/1986 | Duncan .................. 428/40 |
| 4,582,752 A | 4/1986 | Duncan .................. 428/317.9 |
| 4,582,753 A | 4/1986 | Duncan .................. 428/317.9 |
| 4,585,679 A | 4/1986 | Karabedian .................. 428/35 |
| 4,585,752 A | 4/1986 | Ernest .................. 502/314 |
| 4,587,158 A | 5/1986 | Ewing .................. 428/219 |
| 4,604,324 A | 8/1986 | Nahmias et al. ............ 428/349 |
| 4,613,643 A | 9/1986 | Nakamura et al. .......... 524/426 |
| 4,617,199 A | 10/1986 | Galli et al. .................. 427/208 |
| 4,617,241 A | 10/1986 | Mueller .................. 428/520 |
| 4,626,455 A | 12/1986 | Karabedian .................. 428/35 |
| 4,626,460 A | 12/1986 | Duncan .................. 428/40 |
| 4,650,721 A | 3/1987 | Ashcraft et al. ............ 428/516 |
| 4,661,188 A | 4/1987 | Fumei et al. .......... 156/244.11 |
| 4,663,216 A | 5/1987 | Toyoda et al. .............. 428/212 |
| 4,673,611 A | 6/1987 | Crass et al. .................. 428/215 |
| 4,680,234 A | 7/1987 | Kelch .................. 428/461 |
| 4,695,503 A | 9/1987 | Liu et al. .................. 428/207 |
| 4,702,954 A | 10/1987 | Duncan .................. 428/213 |
| 4,713,273 A | 12/1987 | Freedman .................. 428/40 |
| 4,716,068 A | 12/1987 | Seifried et al. ............ 428/141 |
| 4,724,186 A | 2/1988 | Kelch .................. 428/344 |
| 4,725,454 A | 2/1988 | Galli et al. .................. 427/208 |
| 4,769,284 A | 9/1988 | Kakugo et al. ............ 428/349 |
| 4,780,364 A | 10/1988 | Wade et al. ............ 428/315.5 |
| 4,837,088 A | 6/1989 | Freedman .................. 156/243 |
| 4,865,908 A | 9/1989 | Liu et al. .................. 428/248 |
| 4,888,075 A | 12/1989 | Freedman .................. 156/243 |
| 4,923,722 A | 5/1990 | Kondo et al. ............ 428/34.9 |
| 4,946,532 A | 8/1990 | Freeman .................. 156/243 |
| 4,966,795 A | 10/1990 | Genske et al. ............ 428/34.3 |
| 4,977,006 A | 12/1990 | Smith et al. .................. 428/42 |
| 5,026,592 A | 6/1991 | Janocha et al. ............ 428/204 |
| 5,028,480 A | 7/1991 | Dean .................. 428/314.4 |
| 5,064,893 A | 11/1991 | Hoenigmann .............. 524/427 |
| 5,068,155 A | 11/1991 | Yamada et al. ............ 428/515 |
| 5,097,955 A | 3/1992 | Kluter et al. .............. 206/497 |
| 5,143,570 A | 9/1992 | Freedman .................. 156/230 |
| 5,151,309 A | 9/1992 | Dollinger .................. 428/40 |
| 5,176,954 A | 1/1993 | Keller et al. .............. 428/317.9 |
| 5,182,168 A | 1/1993 | Chu et al. .................. 428/330 |
| 5,186,782 A | 2/1993 | Freedman .............. 156/244.11 |
| 5,240,789 A | 8/1993 | Breen et al. .............. 429/176 |
| 5,242,650 A | 9/1993 | Rackovan et al. .......... 264/509 |
| 5,273,798 A | 12/1993 | Miner .................. 428/40 |
| 5,275,886 A | 1/1994 | Chu et al. .................. 428/421 |
| 5,284,688 A | 2/1994 | Hiatt .................. 428/40 |
| 5,288,548 A | 2/1994 | Weber .................. 428/315.9 |
| 5,330,812 A | 7/1994 | Knoerzer et al. ............ 428/40 |
| 5,338,790 A | 8/1994 | Chatterjee .................. 524/400 |
| 5,348,780 A | 9/1994 | Boggs et al. .................. 428/42 |
| 5,372,669 A | 12/1994 | Freedman .................. 156/243 |
| 5,376,417 A | 12/1994 | Amano et al. .............. 428/40 |
| 5,380,572 A | 1/1995 | Kotani et al. .................. 428/40 |
| 5,387,388 A | 2/1995 | Van Erden et al. .......... 264/280 |
| 5,435,963 A | 7/1995 | Rackovan et al. .......... 264/509 |
| 5,451,283 A | 9/1995 | Josephy et al. .............. 156/229 |
| 5,451,455 A | 9/1995 | Peiffer et al. .............. 428/323 |
| 5,455,092 A | 10/1995 | Tung .................. 428/40 |
| 5,468,535 A | 11/1995 | Amano et al. .............. 428/40 |
| 5,474,820 A | 12/1995 | Murschall et al. .......... 428/35.7 |
| 5,489,454 A | 2/1996 | Peiffer et al. .............. 428/34.9 |
| 5,492,757 A | 2/1996 | Schuhmann et al. ......... 428/329 |
| 5,494,717 A | 2/1996 | Peiffer et al. .............. 428/34.9 |
| 5,496,600 A | 3/1996 | Peiffer et al. .............. 428/35.7 |
| 5,508,090 A | 4/1996 | Peiffer et al. .............. 428/214 |
| 5,516,393 A | 5/1996 | Freedman .................. 156/229 |
| 5,516,563 A | 5/1996 | Schumann et al. ........ 428/34.2 |
| 5,560,885 A | 10/1996 | Murschall et al. .......... 264/469 |

| | | | | | |
|---|---|---|---|---|---|
| 5,573,723 A | 11/1996 | Peiffer et al. ............... 264/448 | EP | 1116745 | 7/2001 |
| 5,585,193 A | 12/1996 | Josephy et al. ............. 428/515 | GB | 1145199 | 3/1969 |
| 5,597,640 A | 1/1997 | Van Erden et al. ......... 428/192 | GB | 1384556 | 2/1975 |
| 5,637,366 A | 6/1997 | Davis et al. ............... 428/35.8 | GB | 1404018 | 8/1975 |
| 5,660,787 A | 8/1997 | Van Erden et al. ......... 264/476 | GB | 1465973 | 3/1977 |
| 5,662,985 A | 9/1997 | Jensen et al. ............... 428/195 | GB | 1578517 | 11/1980 |
| 5,688,536 A | 11/1997 | Van Erden et al. ...... 425/174.4 | GB | 2099754 | 12/1982 |
| 5,700,564 A | 12/1997 | Freedman ................... 428/332 | GB | 2103513 | 2/1983 |
| 5,707,660 A | 1/1998 | Van Erden et al. ...... 425/174.4 | JP | 50092327 | 7/1975 |
| 5,709,937 A | 1/1998 | Adams et al. ............... 428/332 | JP | 51081885 | 7/1976 |
| 5,712,031 A | 1/1998 | Kelch et al. ................ 428/355 | JP | 55126441 | 9/1980 |
| 5,733,615 A | 3/1998 | Rackovan et al. ......... 428/35.7 | JP | 57049554 | 3/1982 |
| 5,741,565 A | 4/1998 | Coosemans et al. ....... 428/35.2 | JP | 58025929 | 2/1983 |
| 5,756,169 A | 5/1998 | Peiffer et al. ............. 428/34.9 | JP | 58025930 | 2/1983 |
| 5,756,173 A | 5/1998 | Tung et al. ................ 428/40.1 | JP | 58113283 | 7/1983 |
| 5,837,349 A | 11/1998 | Van Erden et al. ......... 428/192 | JP | 58119857 | 7/1983 |
| 5,849,419 A | 12/1998 | Josephy et al. ............. 428/516 | JP | 58123573 | 7/1983 |
| 5,861,201 A | 1/1999 | Blackwelder et al. .... 428/36.91 | JP | 59049971 | 3/1984 |
| 5,871,829 A | 2/1999 | Nishizawa et al. ......... 428/40.1 | JP | 59122570 | 7/1984 |
| 5,900,310 A | 5/1999 | Murschall et al. .......... 428/214 | JP | 59159875 | 2/1985 |
| 5,922,471 A | 7/1999 | Chatterjee ................... 418/461 | JP | 60026025 | 6/1985 |
| 5,949,971 A | 9/1999 | Levine et al. .......... 395/184.01 | JP | 60178132 | 11/1985 |
| 5,961,766 A | 10/1999 | Chang et al. ............... 156/247 | WO | WO 86/01550 | 3/1986 |
| 5,985,075 A | 11/1999 | Freedman ................... 156/229 | WO | WO 90/00788 | 1/1990 |
| 6,001,290 A | 12/1999 | Lin ............................ 264/129 | WO | WO 93/03695 | 3/1993 |
| 6,010,783 A | 1/2000 | Tung ......................... 428/343 | WO | WO 93/17462 | 9/1993 |
| 6,033,514 A | 3/2000 | Davis et al. ........... 156/244.11 | WO | WO 95/01397 | 1/1995 |
| 6,040,027 A | 3/2000 | Freedman ................. 428/40.1 | WO | 9730841 | 8/1997 |
| 6,093,464 A | 7/2000 | Tokunaga et al. .......... 428/40.1 | WO | 99/42281 | 8/1999 |
| 6,106,934 A | 8/2000 | Buongiorno et al. ....... 428/213 | WO | 99/44826 | 9/1999 |
| 6,146,744 A | 11/2000 | Freedman ................... 428/213 | WO | 99/64533 | 12/1999 |
| 6,150,013 A | 11/2000 | Balaji et al. ................ 428/220 | WO | 00/73064 | 12/2000 |
| 6,150,035 A | 11/2000 | DeFife et al. ............... 428/500 | WO | WO 01/46314 | 6/2001 |
| 6,156,252 A | 12/2000 | Freedman .............. 264/173.15 | WO | 01/60607 | 8/2001 |
| 6,183,856 B1 | 2/2001 | Amon ..................... 428/318.4 | | | |
| 6,231,975 B1 | 5/2001 | Kong et al. ................ 428/355 | | | |
| 6,245,418 B1 | 6/2001 | Freedman ................... 428/220 | | | |
| 6,299,956 B1 | 10/2001 | Freedman ................... 428/41.8 | | | |
| 6,300,415 B1 | 10/2001 | Okayama et al. ........... 525/191 | | | |
| 6,322,883 B1 | 11/2001 | Williams ................ 428/308.4 | | | |
| 6,364,988 B1 | 4/2002 | Lin ....................... 156/244.17 | | | |
| 6,376,058 B1 | 4/2002 | Schut et al. ................ 428/220 | | | |
| 6,379,605 B1 | 4/2002 | Lin ............................ 264/414 | | | |
| 6,379,665 B1 | 4/2002 | Frohman et al. ........... 424/94.6 | | | |
| 6,391,425 B1 | 5/2002 | Migliorini et al. .......... 428/172 | | | |
| 6,403,190 B1 | 6/2002 | Casey et al. ............... 428/41.8 | | | |
| 6,451,426 B2 | 9/2002 | Kong et al. ................ 428/355 | | | |
| 6,451,446 B1 | 9/2002 | Regnier ...................... 428/515 | | | |
| 6,455,171 B2 | 9/2002 | Scheibelhoffer et al. .... 428/517 | | | |
| 6,461,555 B1 | 10/2002 | Freedman .............. 264/173.15 | | | |
| 6,472,077 B1 | 10/2002 | Cretekos et al. ............ 428/447 | | | |
| 6,503,635 B1 | 1/2003 | Kong et al. ................ 428/461 | | | |
| 6,506,500 B2 | 1/2003 | Rasp et al. ................. 428/516 | | | |
| 6,534,189 B1 | 3/2003 | Burns et al. ................ 428/447 | | | |
| 6,576,329 B2 | 6/2003 | Kong ........................ 428/213 | | | |
| 6,583,209 B2 | 6/2003 | Mehta et al. ................ 524/445 | | | |
| 2001/0039314 A1 | 11/2001 | Mehta et al. ................ 525/240 | | | |
| 2001/0044506 A1 | 11/2001 | Mehta et al. .................. 526/65 | | | |
| 2002/0006520 A1 | 1/2002 | Rasp et al. ................. 428/516 | | | |
| 2002/0028340 A1 | 3/2002 | Fujii et al. .................. 428/516 | | | |
| 2002/0115795 A1 | 8/2002 | Shang et al. ................ 525/192 | | | |
| 2002/0160170 A1 | 10/2002 | Ishige et al. ................ 428/220 | | | |
| 2003/0072957 A1 | 4/2003 | Lee et al. ................... 428/515 | | | |
| 2003/0092816 A1 | 5/2003 | Mehta et al. ................ 524/445 | | | |

FOREIGN PATENT DOCUMENTS

| | | |
|---|---|---|
| EP | 591757 B1 | 4/1994 |
| EP | 744 284 | 4/1996 |
| EP | 794523 B1 | 9/1997 |
| EP | 852611 B1 | 7/1998 |
| EP | 1 106 345 | 12/2000 |

OTHER PUBLICATIONS

Affidavit of Mary C. Boyce—dated Sep. 1, 1999.
Affidavit of Michael F. Heaney.
Affidavit—Supplemental Affidavit of Professor Mary C. Boyce—dated Sep. 17, 19990.
Bicor IG Biaxially Oriented Polypropylene Film Product Fact Sheet, Mobil Chemical Films Division.
Bicor Oppalyte ASW Product Fact Sheet, Mobile Chemical Films Division.
Bicor Oppalyte HSW Product Fact Sheet, Mobil Chemical Films Division.
Bicor Oppalyte HW Product Fact Sheet, Mobil Chemical Films Division.
Coextrusion Coating Test Equipment.
Declaration of Allen Fontaine.
Declaration of Christian Pastre.
Declaration of Richard H. White.
Dow Test of Composite Film Described in JP 59049971.
FLEXcon Prior Art Documents, Avery v. FLEXcon, C.A. No. 96C4820.
Full English Translation of JP 59–49971.
Hercules WT503, WT502/1S and WT502/2S, Product Bulletin, Hercules Incorporated, FC–17G.
JIS L 1096–1990 Test Method, p. 743, Japanese Industrial Standards Handbook.
MICAFIL 40, Information Sheet, DuPont Canada, Inc.
Shell & Solvay Polypropylene Grade Range Data Sheets (includes TAPPI Test T 498 and cm–85—softness of Sanitary Tissues).
TAPPI Test T 543—Stiffness of Paper (Gurley type stiffness tester).
Walothen CF Technical Data Brochure.

TAPPI, "Instrumentation Studies XXXV—The Clark Paper Softness Tester, with an Important Note on the Gurley Stiffness Tester," written by the Staff of the Institute of Paper Chemistry, Feb. 15, 1940.

"Plastic Film, Process and Application", p. 160, Gihodo Co. Ltd. (Jul. 10, 1971)

Schrenk et al., "Coextrusion of Brown Multilayer Plastic Films" presented at the 163rd Meeting of the American Chemical Society in Boston, Apr. 1972.

H.H. Walbaum et al., "Plastic Papers–Materials, Processes, Microstructures," presented at the TAPPI 1974 Testing Paper Synthesis Conference.

T.J. Collier, "Synthetic Paper–Where to Now?", pp. 181–183, presented at the 1974 TAPPI Testing Paper Synthetics Conference.

"Iridescent Films" Paper, Film & Foil Converter, pp. 58–59 (Sep. 1976).

James E. Johnson et al., "Grundzuge der Koextrusion von Platten und Folien," Kunststoffberater Oct. 1976, pp. 538–541.

Norma J. Beckman, "Physical Description and Printing Characteristics of a New Synthetic Printing Paper," TAPPI, vol. 59, No. 7, pp. 124–127 (Jul. 1976).

Plastic Engineering Handbook, $4^{th}$ Ed., 1976, p. 182.

Mearl Iridescent Film Brochure, Sep. 1977.

"Dictionary of Practical Plastic Terminology", pp. 305–306, Plastic Age Co. Ltd. (Jun. 20, 1979).

"Reformulated Iridescent Film" Soap, Cosmetics, Chemical Specialties, p. 103 (Oct. 1979).

Flexcon Dec. 1980 Special Meeting.

Kindberg et al., "Films: Flexibility in Labelling," Paper Film & Foil Converter (Apr. 1980).

Trespaphan Sales Information Center Brochure, Jul. 1980.

"Polypropylene Resin", pp. 68–69, 76 Nikkan Kogyo Shinunsha (Jan. 30, 1981).

B.L. Kindberg, "Films: Flexibility in Labeling," (from a paper presented at the Tag & Label Manufactures Institute's Winter Meeting, 1981), Paper, Film & Foil Converter, vol. 55, No. Apr. 1981. pp. 46–48.

F. Hensen et al., "Entwicklungsstand bei der Coextrusion von Mehrschichtblasfolien und Mehrschichtbreitschlitzfolien," Coextrusion von Mehrschichtblasfolien und–breitschlitzfolien, Kunststoffe 71 (1981) 9, pp. 530–538.

ICI Propafilm MG Brochure, Technical Information Note PF306 (1981).

Kimdura Price List (1981).

Mearl Iridescent Films General Information (Jun. 1981).

Propafilm D804, Provisional Data Sheet PF TD 4 (1981).

Bradely, "Anatomy of a Label Challenge," Food & Drug Packaging (May 1982).

Crown Advanced Films Film Guide (Nov. 1982).

P.T. Galvin, "Conversion of Metallized Melinex and Propafilm," Part 1—Structures (Feb. 24, 1982).

Printing TRYCITE Plastic Films, Brochure, Copyright 1982, The Dow Chemical Company.

Bicor Communication, OPPALYTE Observations, Brochure, Jul. 1, 1983, Mobil Chemical Films Division.

DAF, Dow Adhesive Films Brochure (1983).

Modern Plastics Encyclopedia, 1983–84, vol. 60., No. 10a, Oct. 1983, pp. 489–490.

Pritchard, "Pressure–Sensitive Labelling," Labels & Labelling, Mar. 1983, pp. 14–15 and 17.

Propafilm for Packaging (1983).

The 1983 Packaging Encyclopedia—Materials Chapter, Laminations and Composite Structures, pp. 102–104.

"Heightened Interest in Coextrusion for the Packaging Sector," European Plastics News, Aug./Sep. 1984.

Commercial Dialogue, Apr. 30, 1984, "Coca–Cola and Pepsi Test Dow's Label Film".

Kim Caldwell, "State of the Art in Pressure–Sensitive Labelling in America," Labels & Labelling, May 1984, pp. 32–33.

New OPTICITE Polystyrene Label Films, brochure, The Dow Chemical Company, Form No. 500–1053–84, Copyright 1984.

OPTICITE Soft Drink Label Film, information Sheet, Copyright 1984, The Dow Chemical Company, Form No. 500–1054–84.

OPTICITE Soft Drink Label Film 320, information sheet, The Dow Chemical Company, Form No. 500–1046–84, Copyright 1984.

Plastic Film Labels Have Vivid Graphics, High–Gloss, and Moisture Resistance, reprint from Prepared Foods, Sep. 1984, The Dow Chemical Company, Form No. 500–1084–85.

Proprietary Information Disclosure Agreement between Avery International Corporation and Package Products Co., dated Feb. 14, 1984.

Soda Packaging Looks Super when Printed, Information Sheet, Copyright 1984, The Dow Chemical Company.

Label Film Offers Design Options, reprint from Paper, Film & Foil Converter, Apr., 1985, The Dow Chemical Company, Form No. 500–1064–84.

Opportunities and Requirements for Coextruded Beverage Bottle Labels, Paper by Michael C. Paddock at 1985 Coextrusion Conference, pp. 85–98.

OPTICITE Label Film 320—Information Specification Sheet, Copyright 1985, The Dow Chemical Company, Form No. 500–1058–85.

OPTICITE Label Film 320, Information Sheet, Copyright 1985, The Dow Chemical Company, Form No. 500–1046–85.

OPTICITE Label Film 330—Information Specification Sheet, Copyright 1985, The Dow Chemical Company, Form No. 500–1059–85.

OPTICITE Label Film 330, Information Sheet, Copyright 1985, The Dow Chemical Company, Form No. 500–1047–85.

OPTICITE Label Film 410, Information Specification Sheet, Copyright 1985, The Dow Chemical Company, Form No. 500–1061–85.

OPTICITE Label Film 410, Information Sheet, Copyright 1985, The Dow Chemical Company, Form No. 500–1049–85.

OPTICITE Label Film 420—Information Specification Sheet, Copyright 1985, The Dow Chemical Company, Form No. 500–1060–85.

OPTICITE Label Film Supplier Information, Information Sheet, Copyright 1985, The Dow Chemical Company, Form No. 500–1062–85.

OPTICITE Label Film Technical Information for Printing, Information Sheet, Copyright 1985, The Dow Chemical Company, Form No. 500–1063–85.

OPTICITE Label Film XU 65006.06, Information Sheet, Copyright 1985, The Dow Chemical Company, Form No. 500–1048–85.

OPTICITE Label Films—Printing, brochure—Dow Chemical U.S.A., Films Group, Form No. 500–1087–85, Copyright 1985.

OPTICITE Soft Drink Label Film, Supplier Information Sheet, Copyright 1985, The Dow Chemical Company, Form No. 500–1050–85.

OPTICITE Soft Drink Label Films, Brochure, Copyright 1985, The Dow Chemical Company.

Printing on OPTICITE Polystyrene Films, Brochure, The Dow Chemical Company, Form No. 500–1076–85, Copyright 1985.

Supplier Information for Users of OPTICITE Films, Information Sheet, The Dow Chemical Company, Form No. 500–1081–85, Copyright 1985.

Search Report for European Application No. 95109857.3, mailed Sep. 18, 1995.

DOW Trial Report, 1997.

Experimental Report of Takashi Sumiya, Aug. 10, 1999.

Related U.S. Appl. No. 08/985,443; filed Dec. 5, 1997; copy of applicaiton and pending claims enclosed.

Related U.S. Appl. No. 08/985,760; filed Dec. 5, 1997; copy of application and pending claims enclosed.

Related U.S. Appl. No. 09/593,535; filed Jun. 14, 2000; copy of application and pending claims enclosed.

CONFORMABLE AND DIE-CUTTABLE BIAXIALLY ORIENTED FILMS AND LABELSTOCKS

CROSS REFERENCE TO RELATED APPLICATION

This application is a division of copending application Ser. No. 09/531,978 filed on Mar. 20, 2000.

FIELD OF THE INVENTION

This invention relates to conformable and die-cuttable biaxially oriented films and labelstocks, and more particularly to biaxially stretch-oriented monolayer and multilayer films and labelstocks.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage and allows for efficient handling of an array of individual labels after the labels are die-cut and the matrix is stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. Dispensability also is dependent upon the stiffness of the facestock. Failure to dispense may also be characterized by the wrinkling of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

In many label applications, it is desirable that the facestock material be a film of polymeric material which can provide properties lacking in paper, such as clarity, durability, strength, water-resistance, abrasion-resistance, gloss and other properties. Historically, polymeric facestock material of thicknesses greater than about 3 mils (75 microns) have been used in order to assure dispensability in automatic labeling apparatuses. For example, plasticized polyvinyl chloride films about 3.5 to 4.0 mils (87.5 to 100 microns) thick were used in label application because these films exhibited the desired flexibility characteristics. However, the migration of the plasticizers used in PVC films to convert the normally rigid films to flexible films was recognized as a major problem area for these types of films resulting in loss of desirable properties such as adhesion, color buildup, shrinkage, and flexibility. Eventually, migration of the plasticizer results in wrinkling, cracking and visual deterioration of the facestock and/or label. Also, it is desirable to reduce the thickness or "down-gauge" the facestock material in order to attain savings in material costs. Such reduction in facestock thickness often has resulted in reduced stiffness and the inability to die-cut and dispense the labels in a reliable commercially acceptable manner using automatic machinery. There also was pressure for environmental reasons to prepare labels from polymer facestocks other than polyvinyl chloride.

Polymeric materials suggested in the prior art as useful in preparing labels include biaxially-oriented polypropylene ("BOPP") of thicknesses down to about 2.0 mils (50 microns). These materials provide cost savings as they are relatively inexpensive, and they have sufficient stiffness to dispense well. However, these materials also have relatively high tensile modulus values in both machine-direction (MD) and cross direction (CD) which results in labels which are not very conformable.

Related conformability problems have been encountered in respect to rigid surfaces such as glass. For example, when biaxially-oriented films are applied to rigid substrates such as glass bottles, the application is not completely successful. The relatively stiff labels have a tendency to bridge surface depressions and the mold seams resulting from bottle-forming processes resulting in an undesirable surface appearance of the applied label simulating trapped air bubbles. This has somewhat impeded the use of pressure-sensitive adhesive labels to replace prior glass bottle labeling techniques such as ceramic ink directly bonded to the bottle surface during glass bottle manufacturing processes as customers find the appearance unattractive. Such ceramic ink techniques are environmentally undesirable due to objectionable ink components and the contamination of the ink in the crushed bottle glass in recycling processes. Attempts to use the relatively stiff oriented polypropylene films on flexible substrates such as plastic bottles also have not been completely successful because the labels do not have the flexibility required to conform to the flexible plastic containers. Oriented polypropylene films are also more difficult to print than PVC or polyethylene films.

Other useful materials are unoriented polyethylene and polypropylene films that are also relatively inexpensive and conformable. However, both of these films are difficult to die-cut and do not dispense well at low calipers. In Europe, an unoriented, relatively thick polyethylene facestock has been used successfully in preparing labels. The facestock is die-cuttable and the labels can be dispensed in high speed automatic dispensing equipment. The normal thickness of this "standard" polyethylene facestock in Europe is about 4.0 mils (100 microns). Attempts to reduce the gauge of the polyethylene facestock to reduce costs has not yet met with any degree of success because the thinner polyethylene facestock is not readily die-cuttable with the die leaving a mark on the liner and stringers on the cut label. Additionally, the thinner facestock becomes difficult to dispense at higher speeds over a peel plate because of reduced stiffness.

SUMMARY OF THE INVENTION

One embodiment of this invention is a die-cuttable, biaxially stretch-oriented monolayer film comprising a polyethylene having a density of about 0.940 $g/cm^3$ or less, a propylene polymer or copolymer, or mixtures thereof, wherein the tensile modulus of the film in the machine direction is greater than the tensile modulus in the cross direction, the tensile modulus of the film in the cross direction is about 150,000 psi or less, and the film is free of copolymers of ethylene with an ethylenically unsaturated carboxylic acid or ester. In one embodiment, the biaxially oriented monolayer films have been biaxially stretch-oriented and heat set.

In another embodiment, the invention relates to a die-cuttable, stretch-oriented multilayer film comprising (A) a base layer having an upper surface and a lower surface, and comprising polyethylene having a density of about 0.940 g/cm³ or less, a propylene homopolymer or copolymer, or mixtures thereof wherein the base layer is free of copolymers of ethylene with an ethylenically unsaturated carboxylic acid or ester, and (B) a first skin layer of a thermoplastic polymer bonded to the upper surface of the base layer, wherein the tensile modulus of the multilayer film in the machine direction is greater than the tensile modulus in the cross direction, and the tensile modulus in the cross direction is about 150,000 psi or less. The biaxially oriented multilayer films are useful in particular in preparing adhesive containing labelstock for use in adhesive labels.

In yet another embodiment, the invention relates to a die-cuttable, biaxially stretch-oriented monolayer film comprising at least one polyolefin wherein the film has been stretch-oriented in the machine direction at a stretch ratio of about 9:1 to about 10:1, and in the cross direction at a stretch ratio of from greater than 1:1 to about 3:1.

DESCRIPTION OF THE PREFERRED EMBODIMENTS

The present invention, in one embodiment, relates to the discovery that biaxially stretch-oriented monolayer and multilayer films can be prepared which are characterized as having improved conformability, die-cuttability, and/or dispensability. In some embodiments, films having improved clarity can be prepared. Although conformable films usually have poor die-cutting properties, the present invention provides conformable films that have acceptable die-cutting properties, and, therefore, these films may be used for labeling bottles and tubes or in other label applications that require clarity and conformability. Multilayered film constructions can be prepared in accordance with the present invention having skin layers designed to provide printability, or to provide other desirable characteristics such as stiffness so that the film can be down gauged, or both.

In one embodiment, the biaxially stretch-oriented monolayer films of the present invention comprise a polyethylene having a density of about 0.940 g/cm³ or less, a propylene polymer or copolymer, or mixtures thereof, wherein the tensile modulus of the film in the machine direction is greater than the tensile modulus in the cross direction, the tensile modulus of the film in the cross direction is about 150,000 psi or less, and the film is free of copolymers of ethylene with an ethylenically unsaturated carboxylic acid or ester.

Useful ethylene homopolymers include those having densities of about 0.940 or less. Polyethylenes having densities of from 0.850 to about 0.925 g/cm³ generally are referred to as low density polyethylenes, and polyethylenes having densities between about 0.925 and 0.940 g/cm³ are referred to in the art as being medium density polyethylenes. The low and medium density polyethylenes also may be characterized as having a melt index (as determined by ASTM Test D1238, condition E) in the range of from 0.5 to about 25. In addition to the above densities, and melt indices, the low density polyethylenes may be characterized by tensile strengths of between about 2200 to about 3200 psi (typically about 2700 psi), and the medium density polyethylenes may be characterized as having tensile strengths of between about 3000 and about 4000 psi (typically about 3400 psi).

Low and medium density polyethylene useful in the first skin layer of the facestock of this invention are available commercially from a variety of sources. Examples of useful polyethylenes are summarized in the following Table I.

TABLE I

Commercial Polyethylenes

| Commercial Designation | Company | Melt Index (g/10 mins) | Density (g/cm³) |
|---|---|---|---|
| Rexene 1017 | Rexene | 2.0 | 0.920 |
| Rexene 1058 | Rexene | 5.5 | 0.922 |
| Rexene 1080 | Rexene | 2.0 | 0.930 |
| Rexene 2030 | Rexene | 5.0 | 0.919 |
| Rexene 2034 | Rexene | 7.5 | 0.925 |
| Rexene 2038 | Rexene | 9.0 | 0.917 |
| Rexene 2040 | Rexene | 12.0 | 0.917 |
| Rexene 2049 | Rexene | 20.0 | 0.917 |
| NA-334 | Equistar | 6.0 | 0.918 |
| NA-217 | Equistar | 5.5 | 0.923 |
| NA 285-003 | Equistar | 6.2 | 0.930 |
| Exact 3027 | Exxon | 3.5 | 0.900 |
| Exact 3022 | Exxon | 9.0 | 0.905 |
| Exact 3139 | Exxon | 7.5 | 0.900 |
| SLP 9053 | Exxon | 7.5 | 0.900 |
| Affinity PF1140 | Dow Chemical | 1.6 | 0.895 |
| Sclair 11G1 | Nova | 0.72 | 0.920 |
| Dowlex 2027 | Dow Chemical | 4.0 | 0.941 |

The monolayer film may comprise a propylene homopolymer or copolymer, or a blend of a propylene homopolymer and at least one propylene copolymer. When blends of homopolymers and copolymers are used in the film, the blends may comprise from about 5% to about 95% of the homopolymer and correspondingly from about 95% to about 5% by weight of the copolymer. The propylene homopolymers which may be utilized either alone or in combination with a propylene copolymer as described herein, include a variety of propylene homopolymers such as those having melt flow rates (MFR) from about 1 to about 20 as determined by ASTM Test D1238, condition L. Propylene homopolymers having MFRs of at least about 4 (preferably at least about 8) are particularly useful and provide films having improved die-cuttability. Useful propylene homopolymers also may be characterized as having densities in the range of about 0.88 to about 0.92 g/cm³.

A number of useful propylene homopolymers are available commercially from a variety of sources. Some of the useful homopolymers are listed and described in the following Table II.

TABLE II

Commercial Propylene Homopolymers

| Commercial Designation | Company | Melt Flow g/10 mins | Density (g/cm³) |
|---|---|---|---|
| WRD5-1057 | Union Carbide | 12.0 | 0.90 |
| DX5E66 | Union Carbide | 8.8 | 0.90 |
| 5A97 | Union Carbide | 3.9 | 0.90 |
| 5E98 | Union Carbide | 3.2 | 0.90 |
| Z9470 | Fina | 5.0 | 0.89 |
| Z9470HB | Fina | 5.0 | 0.89 |
| Z9550 | Fina | 10.0 | 0.89 |
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |

The propylene copolymers which may be utilized generally comprise copolymers of propylene and up to about 40% by weight of at least one alpha-olefin selected from ethylene and alpha-olefins containing from 4 to about 8 carbon atoms.

Examples of useful alpha-olefins include ethylene, 1-butene, 1-pentene, 4-methyl-1-pentene, 1-hexene, 1-heptene, and 1-octene. More often, the copolymers of propylene which are utilized in the present invention comprise copolymers of propylene with ethylene, 1-butene or 1-octene. The propylene alpha-olefin copolymers useful in the present invention include random as well as block copolymers although the random copolymers generally are preferred. Blends of the copolymers as well as blends of the copolymers with propylene homopolymers can be utilized as the composition for the base layer. In one preferred embodiment, the propylene copolymers are propylene-ethylene copolymers with ethylenic contents of from about 0.2% to about 10% by weight. Preferably, the ethylene content is from about 3% to about 10% by weight and more preferably from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-octene copolymers useful in the present invention may contain up to about 40% by weight of 1-octene. More often, the propylene-1-octene copolymers will contain up to about 20% by weight of 1-octene.

The propylene copolymers useful in the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts. A list of some useful commercially available propylene copolymers is found in the following Table III. The propylene copolymers useful in the invention have an MFR of from about 1 to about 20, preferably from about 1 to about 12.

Various nucleating agents and particulate fillers can be incorporated into the monolayer films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), stiffness, and the die-cuttability of the film. Obviously, the amount of nucleating agent added to the film formulation should not have a deleterious effect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10 is a concentrate of 10% Millad 3988 (a sorbitol nucleating agent) and 90% polypropylene and is available from Milliken Chemical Co.

TABLE III

Commercial Propylene Copolymers

| Commercial Name | Source | % Ethylene | % 1-Butene | Melt Flow Rate (g/10 mins) | Density (g/cm³) |
| --- | --- | --- | --- | --- | --- |
| DS4D05 | Union Carbide | — | 14 | 6.5 | 0.890 |
| DS6D20 | Union Carbide | 3.2 | — | 1.9 | 0.890 |
| DS6D81 | Union Carbide | 5.5 | — | 5.0 | 0.900 |
| SRD4-127 | Union Carbide | — | 8 | 8.0 | NA |
| SRD4-104 | Union Carbide | — | 11 | 5.0 | NA |
| SRD4-105 | Union Carbide | — | 14 | 5.0 | NA |

The monolayer films of the invention which are described above also are characterized as being free of copolymers of ethylene monomer with an ethylenically unsaturated carboxylic acid or ester comonomer. A film is considered to be free of such copolymers when there is less than about 0.1% by weight of such copolymers in the film. Specific examples of copolymers which are excluded from the films of this embodiment of the invention are the ethylene-vinyl acetate (EVA), ethylene methyl acrylate (EMA) and ethylene n-butyl acrylate (EnBA) copolymers.

Although the films of the invention may contain other polymers and copolymers, the presence of incompatible polymers and copolymers should be minimized or essentially avoided when a clear film (low haze) is desired. The amount of incompatible polymer which can be included depends on the particular polymer (e.g., degree of incompatibility) and the degree of haze that can be tolerated.

When a nucleating agent is incorporated into the film, the amounts of nucleating agent incorporated into the film formulations of the present invention are generally quite small and range from about 100 to about 2000 or 4000 ppm of the film. Preferably the amount of nucleating agent should not exceed about 2000 ppm, and in one embodiment, a concentration of about 300 to 500 ppm appears optimum.

The film may contain other additives and particulate fillers to modify the properties of the film. For example, colorants may be included in the film such as $TiO_2$, $CaCO_3$, etc. The presence of small amounts of $TiO_2$, for example, results in a white facestock. Antiblock agents also can be included in the base layer. AB-5 is an antiblock concentrate available from A. Schulman Inc., 3550 West Market Street, Akron, Ohio 44333, which comprises 5% solid synthetic amorphous silica in 95% low density polyethylene. ABPP05SC is an antiblock concentrate from Schulman containing 5% of the synthetic amorphous silica in a propylene copolymer. The amount of antiblock agent (silica) present in the base layer may range from about 500 to about 5000 ppm, with amounts of about 1000 ppm being preferred.

In some embodiments, particularly where it is desired that the film be clear, the film is free of inert particulate filler material although very small amounts of particulate filler material may be present in the film due to impurities etc. The term "free of" is intended to mean that the film contains less than about 0.1% by weight of particulate filler material. Films which are free of particulate filler are particularly useful when it is desired to prepare a film which is clear which may be characterized as having low haze, for example, less than 10%, or less than 6% haze, or in some instances less than about 2%. Haze or clarity is determined using a BYK-Gardner haze-gloss meter as known in the art. It has been observed that the biaxially stretch-oriented films of this invention which are free of filler particles exhibit improved clarity, and in some instances, the films are crystal clear. As noted above, incompatible polymers and copolymers are absent or present in minor amounts when clear films are desired.

The monolayer films of the present invention can be formed by a variety of techniques known to those skilled in the art including blown or cast extrusion, extrusion coating or by a combination of these techniques. The films of the present invention, as noted above, are biaxially stretch-oriented. Simultaneous biaxial orientation or sequential biaxial orientation may be utilized in preparing the films of the present invention. One preferred process is to produce the monolayer films by simultaneous biaxial orientation processes.

Although it is possible to prepare the desired die-cuttable, biaxially stretch-oriented monolayer films of the present invention by stretching the film in the machine direction (MD) in an amount which is equal to or greater than the stretching in the cross direction (CD), in one embodiment, it is preferred that the stretch orientation in the MD be greater than the orientation in the CD by at least about 10%, or even by 20%. The orientation in the MD may be at a stretch ratio of from about 3:1 to about 10:1 or higher although more often the stretch ratio in the MD is from about 5:1 to about 10:1. In other embodiments, the stretch ratio in the MD may range of from about 9:1 to about 10:1 or higher. As mentioned above, the stretch ratio in the CD often is less than the stretch orientation in the MD. Thus, stretch ratios in the CD may be from greater than 1:1 to about 5:1, or from greater than 1:1 to about 3:1 or greater than 1:1 to about 2:1. In a particular example of this latter embodiment, a monolayer film of a polyolefin stretch-oriented in the MD at a ratio of 9:1 to 10:1 is stretch oriented in the CD at a ratio of from greater than 1:1 to about 2:1 or 3:1 or 4:1. The polyolefins which may be utilized in this embodiment include polyethylenes, polypropylenes, copolymers of propylene and up to about 40% by weight of at least one alpha-olefin selected from ethylene and alpha-olefins containing from 4 to about 8 carbon atoms as described above, and mixtures thereof. Thus, in this particular embodiment, the polyolefins include low density polyethylene, medium density polyethylene and high density polyethylene, although the low and medium density polyethylenes are more often utilized. The high density polyethylenes are those having a density of greater than about 0.940 to about 0.965 g/cm$^3$.

The monolayer films of the invention are biaxially oriented by hot stretching the films at a temperature equal to or above the softening temperature of the film. The temperatures utilized in the hot-stretching step will depend, among other things, on the film composition and whether any nucleating agents are present. When sequential orientation is utilized, the temperature for the MD stretching may not be the same as the temperature for the CD stretching. Generally, the MD orientation is conducted at a lower temperature than the CD orientation. For example, for a propylene homopolymer, the temperature for the MD orientation may be around 140° C. and the temperature for the CD orientation around 180° C.

In one embodiment of the present invention, the monolayer films which have been stretch oriented to the desired stretch ratio while in a heated condition are then passed over annealing rolls where the stretched films are annealed or heat-set. After the heat-setting or annealing operation, the film is then passed over a chill roll to complete the hot-stretch and heat-set operation. In another embodiment, the hot-stretched film is relaxed in both the MD and CD by from about 5 to about 25%, and more often from about 10 to about 20% prior to being subjected to the annealing or heat setting step. The temperature used in the hot-stretching step and the temperature utilized in the heat setting step depends on the particular polymer utilized to form the monolayer film, and these temperatures may range from about 110° C. to about 180° C. The temperatures utilized for the hot-stretching and the heat setting steps may be the same although in some instances, the temperature of the heat setting step is somewhat higher than the temperature utilized for the hot-stretching step. Thus, the heat setting step may be conducted at temperatures of up to about 180° C. When the hot stretched films of the present invention are subjected to a heat setting or annealing step, the film generally is heat set or annealed from about 5 to about 25 seconds, and more often, from about 10 to about 20 seconds. The stretch-oriented monolayer films of the present invention which are also heat-set or annealed are essentially devoid of "memory" of a pre-existing configuration to which a film tends to return under the influence of heat. That is, the heat-set and annealed films of the present invention do not have a tendency to shrink or distort when subsequently subjected to an elevated temperature.

The thickness of the monolayer films described above may range from about 0.5 mils (12.5 microns) to about 6 mils (150 microns) depending upon the anticipated utility of the film. More often, however, the biaxially stretch-oriented monolayer films of this invention have a thickness of from about 1 mil to about 3.5 or 4 mils. In one embodiment, the film thickness will range from about 2 to about 2.5 mils.

The biaxially stretch-oriented monolayer films of the present invention which have been described above exhibit stiffness characteristics which enable the films to be utilized in applications such as die-cuttable labelstock. Thus, the Gurley stiffness of the biaxially stretch-oriented monolayer films of the present invention may range from about 3 to about 50, more often from about 5 or 10 up to about 50 in the machine direction. The Gurley stiffness of the monolayer films of the invention in the cross direction will generally be less than the Gurley stiffness in the machine direction. The Gurley stiffness of the monolayer films of the present invention is measured in accordance with the TAPPI Gurley Stiffness Test T543pm.

As mentioned above, the films of the present invention also may comprise die-cuttable, stretch-oriented multilayer films which comprise (A) a base layer having an upper surface and a lower surface, and comprising polyethylene having a density of about 0.940 g/cm$^3$ or less, a propylene homopolymer or copolymer, or mixtures thereof wherein the base layer is free of copolymers of ethylene with an ethylenically unsaturated carboxylic acid or ester, and (B) a first skin layer of a thermoplastic polymer bonded to the upper surface of the base layer, wherein the tensile modulus of the multilayer film in the machine direction is greater than the tensile modulus in the cross direction, and the tensile modulus in the cross direction is about 150,000 psi or less.

Any of the monolayer films described above, prior to orientation, may be utilized as the base layer of the multilayer film. That is, the base layer of the multilayer films of the present invention may comprise any of the polyethylenes described above, any of the propylene homopolymers or copolymers described above, or mixtures thereof and wherein the base layer is free of copolymers of ethylene with an ethylenically unsaturated carboxylic acid or ester. The base layer also may contain any of the ingredients described above as being optional in the monolayer films such as fillers, colorants, nucleating agents, antiblock agents, etc. If a clear multilayer film is desired, the base layer will be free of inert particulate filler. If an opaque multilayer film is desired, the base layer may contain particulate fillers as described above.

The first skin layer may comprise any other variety of thermoplastic polymers. Examples of thermoplastic polymers and copolymers useful as the first skin layer of the multilayer film compositions of the present invention include polyolefins, polyamides, polystyrene, polystyrene-butadiene, polyester, polyester copolymer, polyurethane, polysulfone, polyvinylidene chloride, styrene-maleic anhydride copolymer, styrene acrylonitrile copolymer, ionomer based on sodium or zinc salts of ethylene methacrylic acid, polymethyl methacrylate, cellulosic, fluoroplastic, acrylic polymer and copolymer, polycarbonate, polyacrylonitrile, ethylene-vinyl acetate copolymer, and mixtures thereof. The composition of the first skin layer is a matter of choice depending on the properties desired for the first skin layer such as costs, weatherability, printability, etc.

The first skin layer may, and often does contain mixtures of polyolefins (e.g., polyethylene, propylene polymers and copolymers) and a copolymer of ethylene with an ethylenically unsaturated carboxylic acid or ester comonomer such as EVA. For example one useful skin composition comprises a 50:50 mixture of polypropylene and EVA.

The first skin layer may also contain other additives such as particulate fillers, antiblock agents, nucleating agents, etc., as described above. When a clear multilayer film is desired, the first skin layer (as well as the base layer), generally will be free of particulate filler material. When an opaque film is desired, the skin layer (and/or the base layer) will contain particulate filler material. Thus, it is possible to prepare the multilayer films of this invention ranging from opaque films to clear films, and the clear films may be characterized as having a haze of less than 10%, or less than 6%, or even less than about 2%.

In yet another embodiment of the present invention, the multilayer films described above comprising a base layer having an upper surface and a lower surface, and a first skin layer of a thermoplastic polymer bonded to the upper surface of the base layer, may also contain a second skin layer bonded to the lower surface of the base layer where the second skin layer may comprise any of the thermoplastic polymers described above as being useful in the first skin layer, and the composition of the second skin layer may be the same as or different from the composition of the first skin layer. Generally, the two skin layers are different since the properties desired for these layers are different. Printability, weatherability, etc. are desired for the first skin layer whereas other properties such as good bonding to an adhesive layer may be desired for the second skin layer.

The multilayer films of the present invention may be prepared by a variety of techniques known to those skilled in the art including blown or cast extrusion, or extrusion coating or by a combination of these techniques. U.S. Pat. No. 5,186,782 (Freedman), and U.S. Pat. No. 5,242,650 (Rackovan et al) and U.S. Pat. No. 5,435,963 (Rackovan et al) disclose useful procedures for preparing multilayer films, and these patents are hereby incorporated by reference. The multilayers can be formed by simultaneous extrusion from a suitable known type of coextrusion die, and the layers are adhered to each other in a permanently combined state to provide a unitary coextrudate. Alternatively, the base layer can be formed by extrusion of the base layer on a substrate followed by extrusion coating of the first skin layer (and optionally the second skin layer) onto the base layer thereby forming a two or three layer structure wherein the layers are adhered to each other in a permanently combined state. In another alternative embodiment, the two or three layers may be separately formed by extrusion and thereafter laminated together by the application of heat and pressure.

Generally, the base layer is relatively thick compared to the first skin layer and the second skin layer. In another, although generally not preferred embodiment, the first skin layer may be relatively thick compared to the base layer. Accordingly, thickness ratios for the three layered films may range from about 90:5:5 to 5:5:90. However, generally preferred thickness ratios for the three layered films (base: first skin:second skin) include 90:5:5, 80:10:10, 70:15:15, 85:5:10, and 80:5:15.

The multilayer films of the present invention, as noted above, are biaxially stretch-oriented. Simultaneous biaxial orientation or sequential biaxial orientation may be utilized in preparing the multilayer films of the present invention. Simultaneous biaxial orientation of the multilayer films of the present invention is a preferred process in one embodiment of the present invention.

Although in some instances, it is possible to prepare the desired die-cuttable, biaxially stretch-oriented multilayer films of the present invention by stretching the film in the machine direction (MD) in an amount which is equal to or greater than the stretching in the cross direction (CD), the stretch orientation in the MD more often will be greater than the orientation in the CD by at least about 10%, or even by 20%. The orientation in the MD may be at a stretch ratio of from about 3:1 to about 10:1 or higher although a preferred stretch ratio in the MD is from about 5:1 to about 10:1. In other embodiments, the stretch ratio in the MD is within the range of from about 9:1 to about 10:1 or higher. As mentioned above, the stretch ratio in the CD generally is less than the stretch orientation in the MD. Thus, stretch ratios in the CD are from greater than 1:1 to about 5:1, or from greater than 1:1 to about 3:1 or greater than 1:1 to about 2:1.

The thickness of the multilayer films described above will range from about 0.5 mils (12.5 microns) to about 6 mils (150 microns) depending upon the anticipated utility of the film. More often, however, the multilayer films of the present invention will have a thickness of about 1 to about 3.5 or 4 mils or from about 2 to about 3 mils. Such thicknesses are particularly useful for preparing labels to be applied to rigid and flexible substrates. As noted earlier, a particular feature of the multilayer film facestocks of the invention is that very thin films (i.e., 1 to 3 mils) can be prepared that are useful in forming labels.

The selection of a particular polymer for the second skin layer is dependent on the properties and characteristics which are to be added by the presence of the second skin layer. The polymer for the second skin layer should be compatible with the polymer of the base layer to provide sufficient adhesion to the base layer. For example, if the base layer contains a propylene polymer, a second skin layer comprising at least some propylene polymer will adhere to the base layer without an intermediate tie layer. It also has been discovered that the use of a composition in the second skin layer that is different from the composition of the first skin layer reduces the blocking tendency when the facestock is rolled on itself.

In one embodiment, it is preferred that the second skin layer comprise a polymer that is softer than the propylene polymer or copolymer, or blends of propylene polymers and copolymers used in the base layer, particularly when the second skin layer is joined with an adhesive to a release coated liner. In particular, it is preferred that the material of the second skin layer has a lower tensile modulus than the tensile modulus of the material comprising the base layer. The use of a lower tensile modulus second skin layer results in a facestock exhibiting improved die-cuttability when compared to a facestock wherein the material of the second skin layer has a higher tensile modulus than the material of the base layer.

The stiffness of the multilayer films of the present invention is important for proper dispensing of labels over a peel plate at higher line speeds. Biaxial orientation of the multilayer films increases the tensile modulus in the machine direction and cross direction. The increase in the machine direction contributes to dimensional stability and good print registration.

The stiffness of the oriented multilayer films in the machine direction generally should be at least about 2 or 3, and may be as high as 50 or 60 Gurley. More often the stiffness of the oriented multilayer films in the MD is in the range of from about 5 or 10 up to about 25 or 35 Gurley as measured in accordance with the TAPPI Gurley Stiffness Test T543pm. The Gurley stiffness in the CD generally is in the same ranges but the stiffness in the CD is less than the stiffness in the MD.

The biaxially stretch-oriented monolayer films and multilayer films of the present invention which have been described above are further characterized as having a tensile modulus in the cross direction of about 150,000 psi or less. The tensile modulus of the films can be determined in accordance with ASTM Test D882 entitled "Tensile Properties of Thin Plastic Sheeting". In one embodiment of the invention, the tensile modulus of the films of the present invention in the cross direction is less than the tensile modulus of the films in the machine direction. Labels prepared from such films are observed to exhibit improved conformability. Thus, in one embodiment, the tensile modulus of the films of the present invention in the machine direction may be as high as 200,000 psi or even as high as 250,000 psi, and the tensile modulus in the cross direction is 150,000 psi or less. In other embodiments, the tensile modulus in the machine direction is 150,000 or less or even 125,000 or less, and the tensile modulus in the cross direction is less than 100,000 psi.

The following Examples identified in Table IV illustrate the monolayer films of the present invention. Unless otherwise indicated in the following Examples and elsewhere in the specification and claims, all parts and percentages are by weight, temperatures are in degrees centigrade, and pressures are at or near atmospheric pressure.

The films in the following Table IV are prepared by extruding the melted charges through an extrusion die and casting on cooling rolls. The extrudate is in the form of sheets which are cut to 10×10 cm$^2$ and subsequently biaxially hot-stretched on a laboratory film stretcher at the ratios specified in Table IV at a draw rate of 400%/second. The stretcher is a type KARO IV stretcher manufactured by Brückner Maschinenbau. The oriented films are relaxed and annealed (heat set) as set forth in Table IV. Some of the properties of the monolayer films of Examples 1–11 are reported in Table V.

TABLE IV

Biaxially Stretch-Oriented Monolayer Films

| Example | Film Composition | Stretch Ratio MD | Stretch Ratio CD | Orientation Temp (° C.) | Relaxation %[1] | Anneal Period (sec.)[2] | Thickness (Mils) |
|---|---|---|---|---|---|---|---|
| 1 | 11G1 | 7:1 | 5:1 | 122 | 10 | 20 | 2.26 |
| 2 | 11G1 | 8:1 | 5:1 | 118 | 10 | 20 | 1.82 |
| 3 | 11G1 | 8:1 | 5:1 | 122 | 10 | 20 | 1.40 |
| 4 | 6D81 | 5:1 | 5:1 | 122 | 10 | 20 | 3.28 |
| 5 | 6D81 | 8:1 | 4:1 | 130 | 10 | 20 | 2.58 |
| 6 | 6D81 | 9:1 | 4:1 | 130 | 10 | 20 | 2.30 |
| 7 | DS4DO5 | 8:1 | 4:1 | 130 | 10 | 20 | 2.46 |
| 8 | DS4DO5 | 10:1 | 2.5:1 | 130 | 10 | 20 | 3.24 |
| 9 | DS4DO5 | 10:1 | 4:1 | 130 | 10 | 20 | 2.16 |
| 10 | 5E98 + 2% NA[3] | 10:1 | 2.5:1 | 160 | 10 | 10 | 2.86 |
| 11 | DS5E98 | 10:1 | 2.5:1 | 160 | 10 | 10 | 2.07 |

[1]Percent reduction in MD and CD stretch ratio
[2]Anneal temperature is same as orientation temperature
[3]Millad 8C41-10

TABLE V

Properties of Biaxially Stretch-Oriented Monolayer Films

| Example | Thickness (Mils) | Gurley Stiffness MD | Gurley Stiffness CD | 2% Secant Modulus (psi) MD | 2% Secant Modulus (psi) CD | Haze (%) |
|---|---|---|---|---|---|---|
| 1 | 2.26 | 7.0 | 5.8 | 63,600 | 33,100 | 1.7 |
| 2 | 1.82 | 3.9 | 3.4 | 42,200 | 28,500 | 2.1 |
| 3 | 1.40 | 1.7 | 1.6 | 42,200 | 32,700 | 4.6 |

TABLE V-continued

Properties of Biaxially Stretch-Oriented Monolayer Films

| Example | Thickness (Mils) | Gurley Stiffness MD | Gurley Stiffness CD | 2% Secant Modulus (psi) MD | 2% Secant Modulus (psi) CD | Haze (%) |
|---|---|---|---|---|---|---|
| 4 | 3.28 | 28.3 | 27.2 | 73,300 | 72,800 | 1.1 |
| 5 | 2.58 | 15.2 | 10.1 | 80,000 | 74,700 | 1.3 |
| 6 | 2.30 | 11.8 | 7.2 | 89,100 | 67,800 | 1.3 |
| 7 | 2.46 | 16.6 | 12.6 | 113,300 | 87,800 | 0.9 |
| 8 | 3.24 | 43.6 | 29.6 | 152,000 | 93,300 | 0.9 |
| 9 | 2.16 | 12.8 | 7.2 | 134,500 | 99,800 | 0.7 |
| 10 | 2.86 | 51.9 | 32.4 | 234,300 | 149,400 | 4.9 |
| 11 | 2.07 | 18.6 | 11.3 | 235,600 | 145,500 | 5.2 |

The following Examples 12–14 illustrate the multilayer films of the invention. The multilayer films are prepared by coextrusion as described above. The films are biaxially oriented at the ratios and at the temperatures shown in Table VI. The draw rate is 400%/second. Some of the properties of the films of Examples 12–14 are reported in Table VII.

TABLE VI

Biaxially Stretch-Oriented Multilayer Films

| Example | Base Layer | Skin Layer | Overall Thickness (Mils) | Stretch Ratio MD | Stretch Ratio CD | Orientation Temp. (° C.) | Relaxation (%)[1] | Anneal Period (Sec)[2] |
|---|---|---|---|---|---|---|---|---|
| 12 | 11G1 | 2027 | 2.14 | 7:1 | 5:1 | 118 | 10 | 20 |
| 13 | 11G1 | 2027 | 2.52 | 8:1 | 4:1 | 130 | 10 | 20 |
| 14 | 6D81 | 50% 5E98 50% EVA* | 2.76 | 8:1 | 4:1 | 130 | 10 | 20 |

*Equistar UESP242F; EVA containing 18% VA
[1]Percent reduction in MD and CD Stretch Ratio
[2]Anneal temperature is same as orientation temperature

TABLE VII

Properties of Biaxially Stretch-Oriented Multilayer Films

| Example | Overall Thickness (Mils) | Gurley Stiffness MD | Gurley Stiffness CD | 2% Secant Modulus (psi) MD | 2% Secant Modulus (psi) CD | Haze (%) |
|---|---|---|---|---|---|---|
| 12 | 2.14 | 4.8 | 4.4 | 43,700 | 33,600 | 2.6 |
| 13 | 2.52 | 17.4 | 11.3 | 86,900 | 71,100 | 5.6 |
| 14 | 2.76 | 16.8 | 12.2 | 73,000 | 63,000 | 71.1 |

The die-cuttability of the biaxially oriented films of Examples 1–14 is evaluated by die-cutting shapes in the films and thereafter measuring the friction energy required to separate the matrix from the die-cut shape. A low friction energy value (e.g., about 150 g-cm or less) indicates the film exhibits good die-cuttability. Friction energy values of less than 120 and even less than 100 are particularly desirable. This test which is conducted as follows is described in more detail in U.S. Pat. No. 5,961,766 entitled "Method For Selecting A Substrate Intended For Use In A Cutting Operation", which patent is hereby incorporated by reference.

A test sheet of each film having the dimensions of 7×10" (17.8×25.4 cm) and a paper liner are advanced through a die-cutter where 10 shapes are cut in the film but not the liner. The die-cutter has a cylindrical profile. The die-cutting roll has a diameter of 3 inches (76.2 mm), with one cavity across and 10 cavities around. Each of the cavities are 6 inches (152.4 mm) long (or across), 15/16 inch (22.25 mm) wide (or deep) and have rounded corners with diameters of 3/32 inch (2.38 mm). The separation between adjacent cavities is 1/8 inch (3.175 mm). The anvil roll has a diameter of 5 inches (127 mm). The gap between the anvil and the tip of the die is 2.2 mils (0.0559 mm). The die pressure is 300 psi (208500 kg/m$^2$), and the speed of the die is 15 m/min.

The die-cut in each test sheet is deep enough to penetrate the film but not the liner. The shapes that are formed are rectangular and arranged side-by-side on the test sheet, one shape across and ten deep. The long dimension of each shape is parallel to the long dimension of the next adjacent shape. The shapes have the dimensions of 7/8×6" (22.25 mm×152.4 mm) and are equidistant from each other. The gap between each shape is 1/8 inch (3.175 mm). A matrix, which consists of the portion of the waste facestock around the shapes, is also formed during the die-cutting.

A test sample is formed by cutting the die-cut test sheet along the center line of the long dimension of one shape and then along the center line of the long dimension of the next adjacent shape. The cuts are parallel to each other. Each test sample consists of one-half of one shape, one-half of the next adjacent shape, the matrix around the shape portions.

The friction energy required to separate the matrix from the die-cut shapes of each sample is measured using a modified TA-XT2 Texture Analyzer provided by Stable Micro Systems, Unit 105, Blackdown Rural Industries, Haste Hill, Haslemere, Surrey GU 273AY, England. The TA-XT2 Texture Analyzer is a tensile testing device. It is modified as follows: the fixture on the top crosshead is removed and substituted by an upper L-shaped bracket; one arm of the upper L-shaped bracket is attached to the upper frame; the platform mounted on the base is removed and substituted by a lower L-shaped bracket. Each test sample is tested by attaching an edge of the matrix of the test sample to the upper L-shaped bracket, and attaching the edge of each shape portion adjacent to the attached matrix edge to the lower L-shaped bracket. The texture analyzer is activated and the matrix is separated from the shape portions at a rate of 5 mm/s.

The force used to separate the matrix and the displacement of this force along the length of the test sample during separating is plotted using software provided with the TA-XT2 Texture Analyzer. The area under the plot is also determined using software provided with the TA-XT2 Texture Analyzer. The area under the plot has the units of gram-seconds. The result is multiplied by the stripping speed (5 mm/s) and after making appropriate corrections for units (i.e., mm to cm), the friction energy results are provided in terms of gram-centimeters (g-cm). Higher friction energy numbers are associated with poorly cut facestocks or adhesive flowback. The test results for the films of Examples 1–14 are summarized in Table VIII. For each film, about seven test samples are tested and the averages for these test samples are given in Table VIII.

TABLE VIII

Friction Energy Test Results

| Film of Example | Friction Energy (g-cm) |
|---|---|
| 1 | 68 |
| 2 | 93 |
| 3 | 109 |
| 4 | 54 |
| 5 | 51 |
| 6 | 41 |
| 7 | 74 |
| 8 | 85 |
| 9 | 43 |
| 10 | 40 |
| 11 | 65 |
| 12 | 57 |
| 13 | 54 |
| 14 | 36 |

In another embodiment of the present invention, the biaxially oriented monolayer or multilayer films of the present invention may be utilized for preparing labelstock for adhesive labels. The labelstock comprises the monolayer film or the multilayer film described above, and an adhesive layer which is adhesively joined to one surface of the film.

In one embodiment, an adhesive containing labelstock used in adhesive labels comprises (A) a die-cuttable, biaxially oriented multilayer film comprising
  (A-1) a base layer having an upper surface and a lower surface, and comprising polyethylene having a density of about 0.940 g/cm$^3$ or less, a propylene polymer or copolymer, or mixtures thereof wherein the base layer is free of copolymers of ethylene with an ethylenically unsaturated carboxylic acid or ester, and
  (A-2) a first skin layer of a thermoplastic polymer bonded to the upper surface of the base layer, wherein the tensile modulus of the multilayer film in the machine direction is greater than the tensile modulus in the cross direction, and the tensile modulus of the multilayer film in the cross direction is 150,000 psi or less, and
(B) an adhesive layer having an upper surface and a lower surface wherein the upper surface of the adhesive layer is adhesively joined to the lower surface of the base layer.

The multilayer film useful in such labelstock is described in detail above. The adhesive layer in this embodiment is adhesively joined to the lower surface of the base layer. Additionally, the biaxially oriented multilayer film (A) may comprise (A-3) a second skin layer bonded to the lower surface of the base layer, and thus, the second skin layer is between the base layer and the adhesive layer. The second skin layers as described above can be utilized.

The adhesive layer may be directly coated on the lower surface of the base layer, or to the second skin layer when present, or the adhesive may be transferred from a liner with which the multilayer film is combined. Typically, the adhesive layer has a thickness in the range of from about 0.1 to about 2 mils (2.5 to 50 microns). Adhesives suitable for use in labelstocks of the present invention are commonly available in the art. Generally, these adhesives include pressure-sensitive adhesives, heat-activated adhesives, hot melt adhesives, and the like. Pressure-sensitive adhesives are particularly preferred. These include acrylic adhesives as well as other elastomers such as natural rubber or synthetic rubbers containing polymers or copolymers of styrene, butadiene, acrylonitrile, isoprene and isobutylene. Pressure-sensitive adhesives are well known in the art and any of the known adhesives can be used with the facestocks of the present invention. In one preferred embodiment, the pressure-sensitive adhesives are based on copolymers of acrylic acid esters, such as, for example, 2-ethyl hexyl acrylate, with polar comonomers such as acrylic acid.

In the manufacture of labelstock from the above-described monolayer and multilayer films in accordance with the invention, liner or carrier stock may be provided. The liner or carrier stock may comprise a multilayer liner made for example as disclosed in U.S. Pat. No. 4,713,273, the disclosure which is incorporated herein by reference, or may be a conventional liner or carrier consisting of a single paper of film layer which may be supplied in roll form. If it has not been previously provided with a release coating and does not itself include components to inherently generate a release surface at its adhesive-contacting face, the liner or carrier may be coated with a release coating (e.g., a silicone). If a release coating is applied, it is dried or cured following application by any suitable means.

The release face of the release liner or carrier may be coated with a layer of pressure-sensitive adhesive for subsequent transfer of the adhesive to the labelstock with which the liner or carrier is employed. When the labelstock is combined with the liner or carrier, the adhesive is joined to the biaxially oriented film. Later, the liner or carrier is removed to expose the adhesive, and the adhesive remains permanently joined to the biaxially oriented film.

In some applications, the adhesive layer may be a heat-activated adhesive or a hot-melt adhesive such as used in in-mold label applications, as distinguished from a pressure-sensitive adhesive. If the adhesive is a heat-activated adhesive or a hot-melt adhesive, there may be no need for the provision of a release liner for inherent releasability such as is required when using a pressure-sensitive adhesive.

The manufacture of pressure-sensitive adhesive labelstock from the above-described biaxially oriented films in accordance with the invention is illustrated as follows. The liner or carrier stock may comprise a multilayer liner or a conventional liner or carrier consisting of a single paper or film layer having a release coating which may be supplied in roll form. The release face of the release liner or carrier may be coated with a layer of pressure-sensitive adhesive for subsequent transfer of the adhesive to the oriented film with which the liner or carrier is employed. When the film is combined with the liner or carrier, the adhesive is joined to the film. Later, the liner or carrier is removed to expose the adhesive, which now remains permanently joined to the biaxially oriented film.

The biaxially oriented film may be printed prior to being die-cut into individual labels. The printing step may occur before or after the combining of liner and oriented film, but will precede the die-cutting of the labelstock into individual labels. The film must remain in accurate register between printing steps (for example, between successive impressions in different colors) in order that image or text be of high quality, and between printing and subsequent die-cutting in order that image or text be located properly on the labels.

The film is under tension during printing, and may be subjected to some increase in temperature, as for example when UV inks are cured, and the film must maintain dimensional stability in the machine-direction.

As noted earlier, the biaxially stretch-oriented films of this invention are die-cuttable, and the labelstock on a liner may be die-cut into a series of spaced pressure-sensitive labels carried by the release liner or carrier. This step may be performed by cutting dies (e.g., rotary cutting dies) in a well-known manner and involves the subsequent stripping of the ladder-shaped matrix of waste or trim surrounding the formed labels when they are die-cut (the "rungs" of the ladder representing the spacing between successive labels). The labels then remain on the liner in spaced relation with each other. One failure mode in this operation involves poorly die-cut labels remaining with the matrix as it is stripped. In this mode, as release levels decrease, poor die-cutting is more likely to cause labels to stay attached to the matrix material and be removed from the liner during matrix stripping along with the matrix. Another failure mode occurs when the die-cut goes through the adhesive and part of the liner leaving an impression in the liner. Another failure mode results when the films being die-cut are of insufficient strength. As the strength of the matrix material decreases, the matrix tends to tear as the matrix around the die-cut labels is pulled from the liner. The films of the present invention have sufficient strength to avoid or reduce breakage of the matrix on stripping.

The die-cut labels on the liner or carrier can be dispensed and applied to various substrates by techniques known to those skilled in the art. For example, the labels can be dispensed and applied to passing workpieces by use of a peel-back edge to dispense the labels by progressively removing the liner or carrier from them to thereby expose the adhesive side of the labels and project the labels into contact with passing workpieces. In the context of the present invention, the workpieces may constitute substrates such as glass bottles or other rigid articles tending to have irregularities in the surface and therefore requiring labels that are flexible and that closely adhere (conform) to the surface without bridging local surface depressions. The substrates also may be flexible plastic containers.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A die-cuttable, biaxially stretch-oriented monolayer film comprising a polyethylene having a density of about 0.940 g/cm$^3$ or less, a propylene polymer or copolymer, or mixtures thereof, wherein the tensile modulus of the film in the machine direction is greater than the tensile modulus in the cross direction, the tensile modulus of the film in the cross direction is about 150,000 psi or less, and the film is free of copolymers of ethylene with an ethylenically unsaturated carboxylic acid or ester.

2. The film of claim 1 comprising a propylene copolymer.

3. The film of claim 2 wherein the propylene copolymer is a copolymer of propylene and up to about 40% by weight of at least one α-olefin selected from ethylene and α-olefins containing from 4 to about 8 carbon atoms.

4. The film of claim 3 wherein the α-olefin is ethylene or 1-butene.

5. The film of claim 1 comprising a polyethylene having a density of from about 0.890 to about 0.925 g/cm$^3$.

6. The film of claim 1 which is free of inert particulate filler.

7. The film of claim 1 containing inert particulate filler.

8. The film of claim 1 having a haze of less than about 10%.

9. The film of claim 1 having a haze of less than about 6%.

10. The film of claim 1 having a haze of less than about 2%.

11. The film of claim 1 wherein the stretch-orientation in the machine direction is greater than the orientation in the cross direction by at least about 10%.

12. The film of claim 11 wherein the film is oriented in the machine direction at a stretch ratio of from about 5:1 to about 10:1.

13. The film of claim 1 wherein the film contains at least one nucleating agent.

14. The film of claim 1 having a Gurley stiffness in the machine direction of from about 10 to about 50.

15. The film of claim 1 having a thickness of about 3.5 mils or less.

16. The film of claim 1 having a thickness of from about 2 to about 2.5 mils.

17. The film of claim 1 wherein the film has been biaxially stretch-oriented and heat set.

18. The film of claim 1 wherein the film comprises polyethylene having a density of from about 0.890 to about 0.925 g/cm$^3$.

19. The film of claim 1 wherein the film has been oriented in the machine direction at a stretch ratio of about 9:1 to about 10:1, and oriented in the cross direction at a stretch ratio of greater than 1:1 up to about 3:1.

20. The film of claim 19 wherein the stretch ratio in the cross direction is less than about 2:1.

21. The film of claim 1 having a friction energy of less than about 120 g-cm.

22. The film of claim 1 having a thickness of from about 1 to about 3.5 mils.

23. The film of claim 1 wherein the film has been stretched in the cross direction at a ratio of from greater than 1:1 up to about 5:1.

24. The film of claim 1 wherein the film has been stretched in the cross direction at a ratio of from greater than 1:1 up to about 4:1.

25. The film of claim 1 wherein the biaxially oriented film is prepared by a simultaneous biaxial orientation process.

26. A die-cuttable, biaxially stretch-oriented monolayer film comprising polyethylene having a density of 0.940 g/cm$^3$ or less, a propylene polymer or copolymer, or mixtures thereof wherein the stretch orientation of the film in the machine direction is greater than the stretch orientation in the cross direction by at least 10%, the tensile modulus of the film in the cross direction is 150,000 psi or less, and the film is free of copolymers of ethylene with an ethylenically unsaturated carboxylic acid or ester.

27. The film of claim 26 wherein the stretch-orientation in the machine direction is greater than the stretch-orientation in the cross direction by at least about 20%.

28. The film of claim 26 wherein the film has been stretched in the machine direction at a ratio of from about 5:1 to about 10:1.

29. The film of claim 26 comprising a polyethylene having a density of from about 0.890 to about 0.925 g/cm$^3$.

30. The film of claim 26 comprising a copolymer of propylene and up to about 40% by weight of at least one olefin selected from ethylene and α-olefins containing from 4 to about 8 carbon atoms.

31. The film of claim 26 wherein the film has been stretch oriented in the machine direction at a ratio of from about 9:1 to about 10:1, and in the cross direction at a ratio of greater than 1:1 to about 3:1.

32. The film of claim 26 having a thickness of from about 1 to about 3.5 mils.

33. The film of claim 26 wherein the film has been stretched in the cross direction at a ratio of from greater than 1:1 up to about 5:1.

34. The film of claim 26 wherein the film has been stretched in the cross direction at a ratio of from grater than 1:1 up to about 4:1.

35. The film of claim 26 wherein the biaxially oriented film is prepared by a simultaneous biaxial orientation process.

36. The film of claim 26 having a haze of less than 10%.

37. A die-cuttable, biaxially stretch-oriented monolayer film having a thickness of from about 1 mil to about 3.5 mils and comprising a polyethylene having a density of about 0.940 g/cm$^3$ or less, a propylene polymer or copolymer, or mixtures thereof, wherein the tensile modulus of the film in the machine direction is greater than the tensile modulus in the cross direction, the tensile modulus of the film in the cross direction is about 150,000 psi or less, the film has been oriented in the machine direction at a stretch ratio of from about 5:1 to about 10:1 and in cross-direction at a stretch ratio of from greater than 1:1 up to about 4:1, and the film is free of copolymers of ethylene with an ethylenically unsaturated carboxylic acid or ester.

38. A die-cuttable, biaxially stretch-oriented monolayer film having a thickness of from about 1 mil to about 3.5 mils and comprising polyethylene having a density of 0.940 g/cm$^3$ or less, a propylene polymer or copolymer, or mixtures thereof wherein the stretch orientation of the film in the machine direction is greater than the stretch orientation in the cross direction by at least 10%, the tensile modulus of the film in the cross direction is 150,000 psi or less, the film has been oriented in the machine direction at a stretch ratio of from about 5:1 to about 10:1 and in cross-direction at a stretch ratio of from greater than 1:1 up to about 5:1, and the film is free of copolymers of ethylene with an ethylenically unsaturated carboxylic acid or ester.

* * * * *